United States Patent
Matsuoka et al.

(10) Patent No.: US 9,987,986 B2
(45) Date of Patent: Jun. 5, 2018

(54) DRIVING SUPPORT DEVICE

(71) Applicant: TOYOTA JIDOSHA KABUSHIKI KAISHA, Toyota-shi, Aichi (JP)

(72) Inventors: Katsuhiro Matsuoka, Nagakute (JP); Kazuhiro Morimoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days. days.

(21) Appl. No.: 15/287,522

(22) Filed: Oct. 6, 2016

(65) Prior Publication Data
US 2017/0129401 A1 May 11, 2017

(30) Foreign Application Priority Data

Nov. 11, 2015 (JP) .................. 2015-220842

(51) Int. Cl.
*B60Q 1/00* (2006.01)
*B60Q 9/00* (2006.01)
*B60R 1/00* (2006.01)

(52) U.S. Cl.
CPC ............... *B60Q 9/008* (2013.01); *B60R 1/00* (2013.01); *B60R 2300/205* (2013.01)

(58) Field of Classification Search
CPC ...... B60Q 9/008; B60R 1/00; B60R 2300/205
USPC ......................................... 340/435
See application file for complete search history.

(56) References Cited

U.S. PATENT DOCUMENTS

| 2011/0128139 | A1 | 6/2011 | Tauchi et al. |
| 2014/0267282 | A1* | 9/2014 | Ren .................. G01C 21/00 345/428 |
| 2016/0001693 | A1* | 1/2016 | Tamura ............ G01C 21/3632 340/441 |
| 2016/0328272 | A1* | 11/2016 | Ahmed .............. G06F 9/4443 |

FOREIGN PATENT DOCUMENTS

| JP | 2004-171459 A | 6/2004 |
| JP | 2008-168799 A | 7/2008 |
| JP | 2011-113385 A | 6/2011 |
| JP | 2014-083984 A | 5/2014 |
| JP | 2015-143970 A | 8/2015 |
| WO | 2015/072013 A1 | 5/2015 |

* cited by examiner

*Primary Examiner* — Tanmay Shah
(74) *Attorney, Agent, or Firm* — Oliff PLC

(57) ABSTRACT

A limited display space provided in a vehicle is used to effectively provide driving support information to a driver. When a notification condition for driving support information is satisfied, an information processing unit generates the driving support information, and determines whether the driving support information is prioritized driving support information or non-prioritized driving support information. When the driving support information is the prioritized driving support information, the information processing unit transmits an output request for the driving support information to an HUD ECU. As a result, the driving support information is displayed on a head-up display. On the other hand, when the driving support information is the non-prioritized driving support information, the information processing unit transmits an output request for the driving support information to a meter ECU. As a result, the driving support information is displayed on a meter display.

12 Claims, 3 Drawing Sheets

DRIVING SUPPORT DEVICE

BACKGROUND OF THE INVENTION

1. Field of the Invention

The present invention relates to a driving support device configured to receive externally transmitted information on vehicle traffic, which is transmitted from a communication device external to an own vehicle, and to give a notification of driving support information to a driver based on the externally transmitted information and own vehicle information.

2. Description of the Related Art

Hitherto, there has been known a driving support device configured to receive externally transmitted information, which is information transmitted from a roadside device, and to support driving of the driver based on the externally transmitted information and own vehicle information. For example, in a driving support device proposed in Japanese Patent Application Laid-open No. 2004-171459, traffic light information transmitted from a traffic light is received by an in-vehicle communication device as externally transmitted information. The traffic light information includes information on a lighting state and a lighting period of the traffic light. The driving support device is configured to calculate a period until the lighting state of the traffic light changes based on the traffic light information when the own vehicle is located near the traffic light, and to display this period on a display device. As a result, the driver can drive while recognizing the period until the lighting state of the traffic light changes.

A system configured to receive the externally transmitted information transmitted from the roadside device by the in-vehicle communication device, and to use the information for the driving support for the driver in this way is referred to as vehicle-infrastructure cooperative system. The externally transmitted information transmitted from the roadside device includes vehicle detection information on vehicles detected in a vicinity of an intersection and the traffic light information on lighting of a traffic light.

The driving support device is configured to operate a notification device so as to provide driving support information when a condition for providing a service for the driving support to the driver is satisfied based on the externally transmitted information and own vehicle information (information representing a position and a driving state of the own vehicle). For example, the driving support device estimates whether or not the driver is overlooking a red traffic signal based on the traffic light information and the own vehicle information. The driving support device is configured to sound a buzzer, and to display the words "Caution: Red Signal", a mark, and the like on a screen of the display device as driving support information when such a condition that the driver is assumed to have overlooked a red traffic signal is satisfied. This can cause the driver to pay attention to the traffic light. The service of providing the driving support information to the driver is not limited to the red traffic signal overlook caution information, that is, a plurality of types of information are provided, and the driving support information is provided depending on an occasional state.

The driving support information is preferably displayed in a manner as visible to the driver as possible. In general, vehicle state information, which is to be notified to the driver, e.g., a vehicle speed, a fuel amount, a battery remaining amount, and a travel distance is displayed on a meter display provided in front of a driver's seat. Thus, the driving support information can also be displayed by using the meter display. In this case, however, the driver needs to change their line of sight during driving. Moreover, the displayed driving support information may be hidden by the steering wheel during a steering wheel operation, and visibility is thus not satisfactory. Therefore, the alert directed to the driver may be delayed.

On the other hand, a head-up display is known as a display high in visibility. The head-up display is configured to display an image on a front windshield on the driver's seat side. In this case, therefore, the driver does not need to change their line of sight and can easily recognize information. The head-up display is used as, e.g., a sub-display of a navigation system. However, for example, when the driving support information is displayed on the head-up display, the display space is limited, and thereby a strict restriction is thus imposed on information provision required by a system (e.g., the navigation system) that has been used.

SUMMARY OF THE INVENTION

The present invention has been made to cope with the above-mentioned problems, and therefore has an object to provide a driving support device which can effectively provide a driver with driving support information by using a limited display space provided inside a vehicle.

In order to achieve the above-mentioned object, a feature of one embodiment of the present invention resides in a driving support device, including:

externally transmitted information acquisition means (12, 20) for acquiring externally transmitted information on vehicle traffic, which is transmitted from a communication device external to an own vehicle;

own vehicle information acquisition means (11, 13) for acquiring own vehicle information representing a position and a driving state of the own vehicle;

determination means (11, S12) for determining whether or not any one of a plurality of set types of notification conditions for a notification to a driver of the own vehicle is satisfied based on the externally transmitted information and the own vehicle information; and notification means (11, 30, 31, 40, 41) for displaying, when any one of the notification conditions is determined to be satisfied, driving support information corresponding to the satisfied notification condition on a display device for the notification to the driver, the notification means including:
- a meter display (41) and a head-up display (31), which are provided as the display device;
- determination means (11, S14) for determining whether the driving support information corresponding to each of the plurality of set types of notification conditions is prioritized driving support information high in necessity of early recognition by the driver or non-prioritized driving support information low in the necessity of the early recognition by the driver compared with the prioritized driving support information; and
- display control means (11, S15, S16) for displaying the prioritized driving support information on the head-up display, and displaying the non-prioritized driving support information not on the head-up display but on the meter display.

According to the one embodiment of the present invention, the externally transmitted information acquisition means is configured to acquire the externally transmitted information on the vehicle traffic, which is transmitted from the communication device external to the own vehicle.

In this case, the externally transmitted information acquisition means is preferably configured to acquire the externally transmitted information including obstacle detection information on an obstacle including at least another vehicle detected at an area in a vicinity of the own vehicle, travel restriction information for restricting a travel of the own vehicle, and map information representing a position of an intersection in the vicinity of the own vehicle and a road connected to the intersection.

For example, the obstacle detection information may include detection information on pedestrians and/or bicycles in addition to other vehicle detection information on other vehicles. The obstacle detection information preferably includes position information on the obstacle and speed information on the obstacle. The travel restriction information preferably includes traffic light information on a lighting of a traffic light (information that can identify a period of a red traffic signal (or a green traffic signal) of the traffic light) installed at an intersection toward which the own vehicle is heading, and road sign information representing a temporary stop position and the like. For example, the map information preferably includes intersection identification information for identifying an intersection, road identification information for identifying roads connected to the intersection, information for representing a reference position of the intersection, information for representing shapes (positions) of the intersection and the connected roads, information for representing stop line positions of the respective connected roads, and lane information on the roads. The map information may include the road sign information.

The own vehicle information acquisition means is configured to acquire the own vehicle information representing the position and the driving state of the own vehicle. The driving state represents, for example, the vehicle speed, driving operation amounts of the driver and the like.

The determination means is configured to determine whether or not any one of the plurality of set types of notification conditions for the notification to the driver of the own vehicle is satisfied based on the externally transmitted information and the own vehicle information. The notification means is configured to display, when any one of the notification conditions is determined to be satisfied, driving support information corresponding to the satisfied notification condition on the display device for the notification to the driver. Thus, the driver can appropriately drive the own vehicle through recognition of the displayed driving support information.

The driving support device provides the driving support information corresponding to the notification condition, and preferably provides information that is high in the necessity of the early recognition by the driver in a display form with as high visibility as possible. On the other hand, information that is low in the necessity of the early recognition by the driver, namely, information that only slightly affects safe travel of the vehicle even when the driver does not recognize the information does not require high visibility.

Therefore, the notification means selectively uses the meter display and the head-up display to display the driving support information. The determination means is configured to determine whether the driving support information corresponding to each of the plurality of set types of notification conditions is the prioritized driving support information high in the necessity of the early recognition by the driver or the non-prioritized driving support information low in the necessity of the early recognition by the driver compared with the prioritized driving support information. The display control means is configured to display the prioritized driving support information on the head-up display, and to display the non-prioritized driving support information not on the head-up display but on the meter display.

Thus, the prioritized driving support information high in the necessity of the early recognition by the driver is displayed on the head-up display, and the driver can thus be provided with the driving support information in a state of excellent visibility (state that requires no change of the line of sight or only a slight amount of change of the line of sight). As a result, the driver can appropriately recognize the state of the own vehicle without delay, and can perform appropriate driving behavior (e.g., a brake operation). In this case, the prioritized driving support information may be displayed on another display, e.g., the meter display in addition to the head-up display.

On the other hand, the non-prioritized driving support information, which is the driving support information low in the necessity of the early recognition by the driver compared with the prioritized driving support information, is not displayed on the head-up display, but is displayed on the meter display. Thus, in this case, a contention with other in-vehicle devices (e.g., a navigation device) in the use of the head-up display does not happen, and the information required by other in-vehicle devices can be provided to the driver by using the head-up display having excellent visibility. Moreover, because the non-prioritized driving support information is the information low in the necessity of the early recognition by the driver, displaying the non-prioritized driving support information on the meter display lower in visibility than the head-up display poses no problem.

As a result, according to the present invention, the limited display space provided in the vehicle is used to effectively provide the driving support information to the driver.

Another feature of one embodiment of the present invention resides in that:

the driving support device further includes steering detection means (S17) for detecting an operation on a steering wheel; and the display control means includes steering-time display control means (S18, S19) for displaying at least a part of the non-prioritized driving support information on the head-up display when the operation on the steering wheel is detected.

Under a state where the driver is operating a steering wheel, the non-prioritized driving support information displayed on the meter display may be hidden by the steering wheel. Therefore, according to the one embodiment of the present invention, the steering detection means is configured to detect the operation on the steering wheel (state where the steering wheel is being operated). For example, the steering detection means is configured to detect the operation on the steering wheel based on a steering angle. The display control means includes the steering-time display control means. The steering-time display control means is configured to display at least a part of the non-prioritized driving support information on the head-up display when the operation on the steering wheel is detected. Thus, the at least a part of the non-prioritized driving support information is displayed on the meter display when the driver is not operating the steering wheel, and is displayed on the head-up display when the driver is operating the steering wheel. As a result, the state where the driving support information is hidden by the steering wheel can be mitigated. For example, the steering-time display control means may be configured to change, when the operation on the steering wheel is detected, the at least a part of the non-prioritized driving support information to the prioritized driving support information, to thereby display the at least a part of the non-prioritized driving support information on the head-up display.

Another feature of one embodiment of the present invention resides in that:

the driving support information includes obstacle presence notification information for notifying, in a case where presence of an obstacle constituting an obstruction to travel of the own vehicle is detected when the own vehicle turns one of right and left at an intersection, the presence of the obstacle, and the determination means is configured to determine that the obstacle presence notification information is the prioritized driving support information.

When the own vehicle turns right at an intersection in a region where the vehicle travels on the left side, another vehicle hidden by a vehicle waiting to turn right in the opposite lane may enter the intersection. Moreover, when the own vehicle turns left at an intersection in a region where the vehicle travels on the right side, another vehicle hidden by a vehicle waiting to turn left in the opposite lane may enter the intersection. Moreover, when the own vehicle turns right or left at the intersection, a pedestrian (including a bicycle) may exist in the direction of the right turn or the left turn. Thus, according to the one embodiment of the present invention, in the case where presence of an obstacle constituting an obstruction to travel of the own vehicle is detected when the own vehicle turns right or left at the intersection, the obstacle presence notification information for notifying the presence of the obstacle is notified to the driver. This obstacle presence notification information is determined to be the prioritized driving support information, and is thus displayed on the head-up display. Thus, the driver can quickly recognize the presence of the obstacle, and can safely pass through the intersection. The obstacle presence notification information may be information for notifying the driver of the presence of the obstacle only when the own vehicle turns right at the intersection, or may be information for notifying the driver of the presence of the obstacle only when the own vehicle turns left at the intersection.

Another feature of one embodiment of the present invention resides in that:

the driving support information includes overlook caution information notified in one of a case where the driver is assumed to overlook a temporary stop sign and a case where the driver is assumed to overlook a red traffic signal, and the determination means is configured to determine that the overlook caution information is the prioritized driving support information.

According to the one embodiment of the present invention, the overlook caution information is notified to the driver in one of the case where the driver is assumed to overlook a temporary stop sign and the case where the driver is assumed to overlook a red traffic signal. This overlook caution information is determined to be the prioritized driving support information, and is thus displayed on the head-up display. Thus, the driver can quickly recognize the overlook of the temporary stop sign or the overlook of the red traffic signal, to thereby safely brake the own vehicle.

Another feature of one embodiment of the present invention resides in that the display control means is configured to restrict, when a notification condition for the prioritized driving support information is satisfied, display of information, which has been displayed on the head-up display until immediately before the satisfaction of the notification condition, and which has been required to be output by another in-vehicle device, to thereby display the prioritized driving support information on the head-up display.

According to the one embodiment of the present invention, while the notification condition for the prioritized driving support information is not satisfied, information which is required to be output by another in-vehicle device (in-vehicle device other than the driving support device according to the present invention) is displayed on the head-up display. Then, when the notification condition for the prioritized driving support information is satisfied, a display, which has been displayed on the head-up display until immediately before the satisfaction of the notification condition, is restricted, and the prioritized driving support information is displayed on the head-up display. For example, while the notification condition for the prioritized driving support information is not satisfied, navigation information which is required to be output by the navigation device is displayed on the head-up display, and when the notification condition for the prioritized driving support information is satisfied, the navigation information, which has been displayed on the head-up display, is restricted, and the prioritized driving support information is displayed on the head-up display instead. Thus, the display area of the head-up display can be temporarily used for the display of the prioritized driving support information. "The restriction on the display of the information" refers to a decrease in the display area of the information, which has been displayed on the head-up display until immediately before the satisfaction of the notification condition, and which has been required to be output by another in-vehicle device. The driving support device may be configured to switch a part of the display area to be used for displaying the prioritized driving support information, or to switch the entirety of the display area to be used for displaying the prioritized driving support information.

In the above description, reference symbols used in an embodiment of the present invention are enclosed in parentheses and are assigned to each of the constituent features of the invention corresponding to the embodiment in order to facilitate understanding of the invention. However, each of the constituent features of the invention is not limited to the embodiment defined by the reference symbols.

DETAILED DESCRIPTION OF THE PREFERRED EMBODIMENTS

Figure 1:
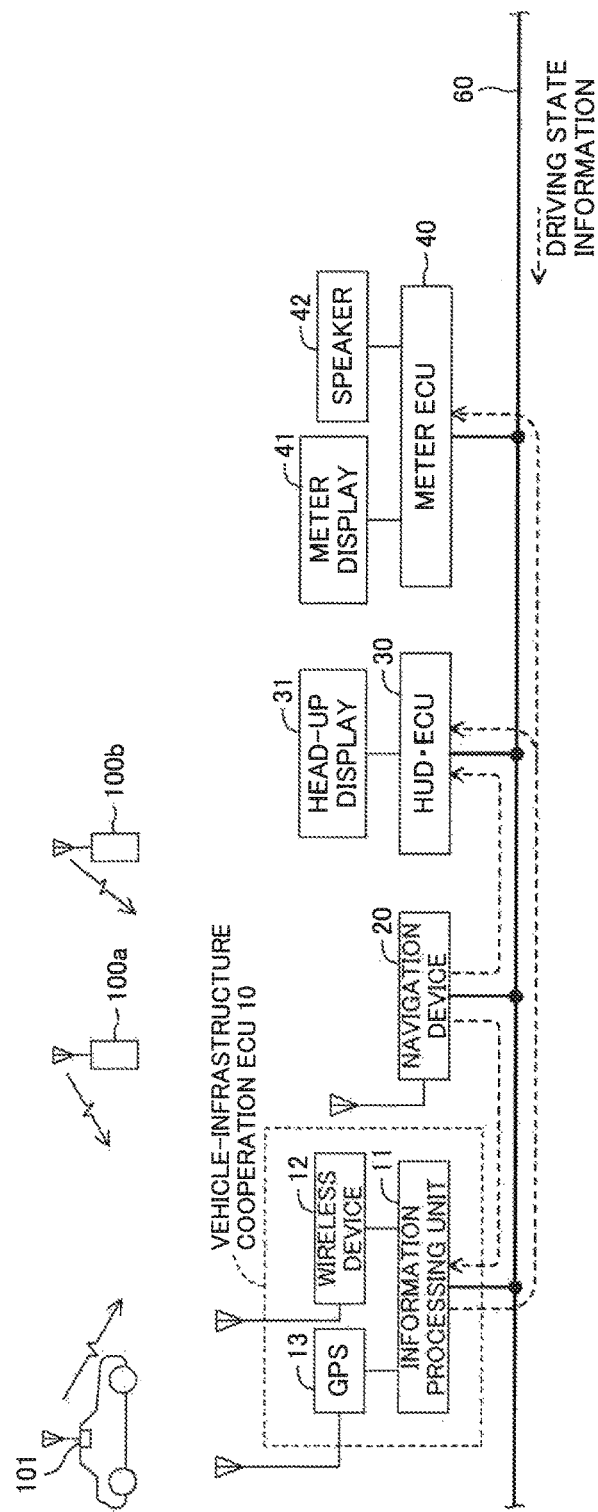
FIG. 1 is a schematic system configuration diagram for illustrating a driving support device according to an embodiment of the present invention.

Referring to the accompanying drawings, an embodiment of the present invention is described in detail below. FIG. 1 is a schematic system configuration diagram for illustrating a driving support device according to this embodiment.

The driving support device is an in-vehicle device, and includes a vehicle-infrastructure cooperation ECU 10, a navigation device 20, an HUD ECU 30, and a meter ECU 40. The vehicle-infrastructure cooperation ECU 10, the navigation device 20, the HUD ECU 30, and the meter ECU 40 are connected to one another via an in-vehicle LAN 60 for mutual transmission/reception. "HUD" is an abbreviation for head-up display. "ECU" is an abbreviation for electric control unit. The ECU includes a microcomputer. In this specification, a vehicle on which the driving support device is installed is referred to as own vehicle.

The vehicle-infrastructure cooperation ECU 10 includes an information processing unit 11, an electric wave media wireless device 12, and a GPS receiver 13. The electric wave media wireless device 12 is a device configured to wirelessly receive externally transmitted information on vehicle traffic, which is transmitted from an electric wave roadside device 100a installed on the road. The electric wave roadside device 100a is a road-to-vehicle communication device, e.g., an electric wave beacon, installed on a roadside of an intersection to be serviced and the like. The electric wave media wireless device 12 includes a function of carrying out mutual wireless communication to/from a vehicle-to-vehicle communication device 101 installed on another vehicle, thereby also receiving information transmitted from another vehicle, in addition to the function of reception from the electric wave roadside device 100a. The electric wave media wireless device 12 is configured to output the received externally transmitted information (including the information transmitted from another vehicle) to the information processing unit 11.

The GPS receiver 13 receives a GPS signal, which is distributed by the GPS satellite and represents position information (latitude and longitude) of the own vehicle. The GPS receiver 13 outputs the received GPS signal to the information processing unit 11.

The information processing unit 11 includes a microcomputer as a main component. The information processing unit 11 is configured to acquire driving state information (such as a vehicle speed, a travel direction, and driving operation amounts (such as an accelerator pedal operation amount, a brake pedal operation amount, and a steering wheel operation amount)) on the own vehicle transmitted via the in-vehicle LAN 60. Moreover, the information processing unit 11 is configured to acquire the position information on the own vehicle from the GPS receiver 13. The microcomputer in this specification includes a CPU and storage devices such as a ROM and a RAM, and the CPU is configured to implement various functions by executing instructions (programs) stored in the ROM.

The navigation device 20 includes a function of receiving the externally transmitted information on the vehicle traffic, which is transmitted from an optical beacon roadside device 100b, in addition to a function of detecting the position and the travel direction of the own vehicle and guiding the own vehicle through a travel route to a destination. The navigation device 20 is configured to use the received externally transmitted information for the travel route guidance, and to transmit the externally transmitted information to the information processing unit 11 of the vehicle-infrastructure cooperation ECU 10 via the in-vehicle LAN 60. The electric wave roadside device 100a and the optical beacon roadside device 100b are hereinafter generally referred to as roadside device 100. Moreover, the externally transmitted information on the vehicle traffic transmitted from the roadside device 100 and other vehicles is referred to as infrastructure information.

The HUD ECU 30 is configured to control the display of a head-up display 31 (hereinafter referred to as HUD 31). The HUD 31 is installed, for example, on a dashboard of the own vehicle, and is configured to display various types of information on the front windshield on the driver's seat side. The HUD 31 enables visual recognition by the driver of displayed information with a small change amount of the line of sight during driving, and is thus used as, e.g., a sub-display of the navigation device 20. The HUD ECU 30 includes a microcomputer and a display driver as main components, and is configured to receive navigation information for HUD display, which is transmitted from the navigation device 20, and to display the navigation information for HUD display on the HUD 31.

Moreover, the HUD ECU 30 is configured to, as described later, when the HUD ECU 30 receives the output request for the driving support information, which is transmitted from the vehicle-infrastructure cooperation ECU 10, display the driving support information on the HUD 31.

The meter ECU 40 is connected to a meter display 41 and a speaker 42. The meter display 41 is a display panel constructed by clustering and arranging meters, e.g., a speedometer, a tachometer, a fuel gauge, a water temperature gauge, an odo/trip meter, and warning lamps, on the dashboard. The meter ECU 40 includes a microcomputer as a main component, and is configured to control display of the meters in accordance with driving state information on the own vehicle, which is transmitted to the in-vehicle LAN 60.

The meter display 41 is provided with a display area (referred to as driving support information display area) for displaying driving support information, which is described later. The driving support information display area may be a dedicated display area for displaying the driving support information, or may be provided so as to be shared as a display area for the meters. The meter ECU 40 is configured to display, when the meter ECU 40 receives the output request for the driving support information, which is transmitted from the vehicle-infrastructure cooperation ECU 10, the driving support information on the driving support information display area of the meter display 41. Moreover, the meter ECU 40 is configured to sound, when the meter ECU 40 receives a buzzer output request transmitted from the vehicle-infrastructure cooperation ECU 10, a buzzer sound using the speaker 42.

The meter display 41 is installed in front of the steering wheel, and when the steering wheel is at a neutral position (steering angle is zero), the display of the meters on the meter display 41 is best in visibility. When the steering wheel is turned by an angle more than a predetermined angle, a visual field of the driver for the meter display 41 is hidden by spoke portions and a pad portion of the steering wheel depending on a position corresponding to the angle. Therefore, when the steering wheel is being operated, the display of the meter display 41 tends to become less visible.

A description is now given of the driving support by the vehicle-infrastructure cooperation ECU 10. The information processing unit 11 is configured to acquire the infrastructure information from the electric wave media wireless device 12 and the navigation device 20. The information processing unit 11 is configured to generate driving support information, which is information for supporting the driving of the driver, based on the position information on the own vehicle, the driving state information on the own vehicle, and the infrastructure information.

The infrastructure information includes intersection information, construction/traffic regulation information, congestion information, emergency vehicle information and the like.

The intersection information includes traffic light information at an intersection (intersection to be serviced) at which the roadside device 100 is installed, vehicle detection information on vehicles detected in a vicinity of the intersection (for example, predetermined range of a distance from a center of the intersection), pedestrian detection information on pedestrians (including bicycles) detected in the vicinity of the intersection, and intersection map information representing positions (shapes) of the intersection and roads connected to the intersection. The vehicle detection information and the pedestrian detection information are transmitted in real time from the electric wave roadside device 100a.

The traffic light information includes information that can be used to identify the period in which the traffic light is red (or green). This period is determined based on a lighting cycle and lighting times of the green, yellow, and red traffic signals of the traffic light at an intersection to be serviced. Moreover, the vehicle detection information includes the position information and the vehicle speed information on vehicles detected on roads in the vicinity of the intersection. The pedestrian information includes position information on pedestrians and/or bicycles detected on the roads in the vicinity of the intersection. The vehicles, the pedestrians, the bicycles, and the like present in the vicinity of the intersection are detected by camera sensors connected to the roadside devices 100. The position of the vehicle is represented by information for identifying a distance from a reference position of the intersection to the vehicle, and a road on which the vehicle is present. The positions of the pedestrians and the bicycles are represented by information similar to the information for identifying the position of the vehicle.

The intersection map information includes an intersection number for identifying the intersection, information representing the reference position of the intersection, road number information for identifying the connected roads connected to the intersection, information for representing shapes (positions) of the intersection and the connected roads, and information for representing stop line positions of the respective connected roads. The information for representing the stop line positions includes road sign information which can be used to determine whether or not the stop line is a temporary stop line at which stopping is enforced. The traffic light information and the road sign information correspond to travel restriction information according to the present invention.

The roadside device 100a is configured to transmit infrastructure information at an area in the vicinity of the roadside device 100a, for example, in a range within a predetermined radius (e.g., 300 m) about the roadside device 100a. Thus, when the own vehicle enters a transmission range of the roadside device 100a, the vehicle-infrastructure cooperation ECU 10 can receive the infrastructure information. As a result, the infrastructure cooperation ECU 10 can acquire the vehicle detection information on vehicles detected in a vicinity of the own vehicle, the pedestrian information on pedestrians (including bicycles) detected in the vicinity of the own vehicle, the traffic light information on traffic lights installed in the vicinity of the own vehicle, and intersection map information in the vicinity of the own vehicle. The vehicle detection information includes the detection information both on the own vehicle and the other vehicles, but the detection information on the own vehicle and the detection information on the other vehicles can be distinguished from each other based on the position of the own vehicle detected by the GPS receiver 13. Thus, the vehicle-infrastructure cooperation ECU 10 can acquire other vehicle detection information on the other vehicles detected in the vicinity of the own vehicle.

The information processing unit 11 is configured to determine whether or not the driving by the driver needs to be supported based on the infrastructure information and the own vehicle information (the position information and the driving state information). When it is determined that the driving by the driver needs to be supported, the information processing unit 11 generates driving support information for supporting the driving by the driver. The information processing unit 11 is configured to provide a driving support service, which is a service of providing (notifying) the driver with the generated driving support information.

As the driving support information provided for (notified to) the driver, a plurality of types of information, e.g., red traffic signal overlook caution information, temporary stop overlook caution information, right turn oncoming vehicle presence notification information, right turn pedestrian presence notification information, left turn pedestrian presence notification information, stopped preceding vehicle presence notification information, side road vehicle presence notification information, ecological driving support information, emergency vehicle approach notification information, and start preparation information are prepared. The information processing unit 11 is configured to determine whether or not a notification condition set for each of the driving support services is satisfied, and to use, when any one of the notification conditions is satisfied, the HUD 31 or the meter display 41 to provide the driving support information corresponding to the satisfied notification condition to the driver.

An application for providing the driving support information to the driver is installed in the information processing unit 11. This application does not always need to include a function of providing all the above-mentioned types of the driving support information, and may include a function of providing driving support information other than that described above.

For example, the information processing unit 11 stores an overlook determination map in which a relationship between a distance from the own vehicle to a stop line at an intersection and an overlook determination vehicle speed is set. The overlook determination map has such a characteristic as to set the overlook determination vehicle speed that decreases as the distance to the stop line decreases. The information processing unit 11 is configured to determine that the driver may be overlooking a red traffic signal when the vehicle speed of the own vehicle is more than the overlook determination vehicle speed under a state in which the traffic light in the intersection toward which the own vehicle is traveling is red, and the accelerator pedal is depressed (notification condition is satisfied). In this case, the information processing unit 11 provides the red traffic signal overlook caution information to the driver.

For example, the information processing unit 11 stores an overlook determination map in which a relationship between the distance from the own vehicle to the temporary stop line and an overlook determination vehicle speed is set. The overlook determination map has such a characteristic as to set the overlook determination vehicle speed that decreases as the distance to the temporary stop line decreases. The information processing unit 11 is configured to determine that the driver may be overlooking a temporary stop sign when the vehicle speed of the own vehicle is more than the overlook determination vehicle speed under a state in which a temporary stop line is present ahead of the own vehicle, and the accelerator pedal is depressed (notification condition is satisfied). In this case, the information processing unit 11 provides the temporary stop overlook caution information to the driver.

For example, the information processing unit 11 is configured to calculate, when an oncoming vehicle traveling toward the intersection from the direction opposite to that of the own vehicle is detected under a state in which the own vehicle is turning right at the intersection, an arrival period until the oncoming vehicle arrives at the reference position of the intersection. The information processing unit 11 is configured to provide the right turn oncoming vehicle presence notification information to the driver as information for notifying the driver of the presence of an oncoming vehicle when an oncoming vehicle having a shorter arrival period than an oncoming vehicle determination period is present (notification condition is satisfied). The driving support device according to this embodiment is used in a country in which the vehicles are regulated to travel on the left side of the road (left-side driving). Thus, for the driving support device used in a country in which the vehicles are regulated to travel on the right side of the road (right-side driving), the left and right sides only need to be considered in reverse. Namely, in this case, "left" and "right" should be treated as being opposite to "left" and "right" in the case where the driving support device is used in a country in which the vehicles are regulated to travel on the left side of the road.

For example, the information processing unit 11 is configured to provide the right turn pedestrian presence notification information to the driver as information for notifying the driver of presence of a crossing pedestrian when a pedestrian (including a bicycle) is detected on a pedestrian crossing in a right turn direction under a state where the own vehicle is turning right at the intersection (notification condition is satisfied).

For example, the information processing unit 11 is configured to provide the left turn pedestrian presence notification information to the driver as information for notifying the driver of presence of a crossing pedestrian when a pedestrian (including a bicycle) is detected on a pedestrian crossing in a left turn direction under a state where the own vehicle is turning left at the intersection (notification condition is satisfied).

When the right turn oncoming vehicle presence notification information, the right turn pedestrian presence notification information, and the left turn pedestrian presence notification information are not distinguished from each other, those pieces of information are hereinafter generally referred to as left/right turn obstacle presence notification information. The left/right turn obstacle presence notification information corresponds to obstacle presence notification information according to the present invention. The obstacle presence notification information according to the present invention only needs to include at least one of the right turn oncoming vehicle presence notification information, the right turn pedestrian presence notification information, and the left turn pedestrian presence notification information, and preferably includes the right turn oncoming vehicle presence notification information.

For example, the information processing unit 11 is configured to provide the driver with the stopped preceding vehicle presence notification information as information for notifying presence of stopped vehicles when other stopped vehicles, which is on a travel lane (on which the own vehicle is present) and ahead of the own vehicle (ahead in the travel direction), are detected in (notification condition is satisfied).

For example, the information processing unit 11 is configured to provide the side road vehicle presence notification information to the driver as information for notifying presence of other vehicles when a side road is connected ahead of the road on which the own vehicle is traveling, and it is detected that other vehicles are present on the side road (notification condition is satisfied).

For example, the information processing unit 11 is configured to provide the ecological driving support information to the driver as information for instructing an early release timing of the accelerator pedal so that ecological driving is implemented when the traffic light of the intersection toward which the own vehicle is traveling is predicted to turn red (notification condition is satisfied).

For example, the information processing unit 11 is configured to provide the emergency vehicle approach notification information to the driver as information for notifying presence of an emergency vehicle (e.g., ambulance) when the information processing unit 11 detects a state in which an emergency vehicle is approaching the own vehicle (notification condition is satisfied).

For example, the information processing unit 11 is configured to provide the start preparation information to the driver as information for representing a waiting period until the traffic light turns green when the own vehicle is stopped at the red traffic signal at the intersection (notification condition is satisfied).

In this way, the information processing unit 11 is configured to recognize the state of an area in the vicinity of the intersection, on which the own vehicle is present, based on the infrastructure information and the own vehicle information, and to provide, when the notification condition set for each of the driving support services is satisfied, the driving support information to the driver.

The information processing unit 11 is configured to transmit the output request for the driving support information to the HUD ECU 30 or the meter ECU 40, and simultaneously transmit the buzzer output request to the meter ECU 40 in order to provide the driving support information to the driver.

A priority is set to each piece of the driving support information, and the transmission destination of the output request for the driving support information is determined based on this priority. The priority is set based on a temporal margin from a timing at which the driving support information is notified to the driver (alert timing) to a safety driving behavior taken by the driver based on the driving support information. The safety driving behavior means the brake operation, the steering operation, or the like.

For example, the driving support information small in the temporal margin from the notification of the driving support information to the safety driving behavior taken by the driver (driving support information high in the necessity of the early recognition by the driver) is set to the driving support information high in priority (hereinafter referred to as prioritized driving support information). Moreover, the driving support information sufficient in the temporal margin from the notification of the driving support information to the safety driving behavior taken by the driver (driving support information low in the necessity of the early recognition by the driver) is set to the driving support information low in priority (hereinafter referred to as non-prioritized driving support information). In this case, the driving support information for which the driver does not need to take the safety driving behavior (e.g., the ecological driving support information and the start preparation information) is set to the non-prioritized driving support information.

For example, as shown in Table 1, out of the pieces of driving support information, the red traffic signal overlook caution information, the temporary stop overlook caution information, and the left/right turn obstacle presence notification information (right turn oncoming vehicle presence notification information, right turn pedestrian presence notification information, and left turn pedestrian presence notification information) are small in the temporal margin from the notification of the driving support information to the safety driving behavior taken by the driver, and are thus set to the prioritized driving support information. The other pieces of the driving support information (stopped preceding vehicle presence notification information, side road vehicle presence notification information, ecological driving support information, emergency vehicle approach notification information, and start preparation information) are sufficient in the temporal margin from the notification of the driving support information to the safety driving behavior taken by the driver, and are thus set to the non-prioritized driving support information.

TABLE 1

| Prioritized Driving Support Information | Red Traffic Signal Overlook Caution Information<br>Temporary Stop Overlook Caution Information<br>Left/right Turn Obstacle Presence Notification Information |
|---|---|
| Non-prioritized Driving Support Information | Stopped Preceding Vehicle Presence Notification Information<br>Side Road Vehicle Presence Notification Information<br>Ecological Driving Support Information<br>Emergency Vehicle Approach Notification Information<br>Start Preparation Information |

The information processing unit 11 is configured to store priority identification information for identifying whether each of the types of the driving support information is the prioritized driving support information or the non-prioritized driving support information. The information processing unit 11 is configured to determine the transmission destination of the output request for the driving support information (display means displaying the driving support information) based on the priority identification information.

Figure 2:
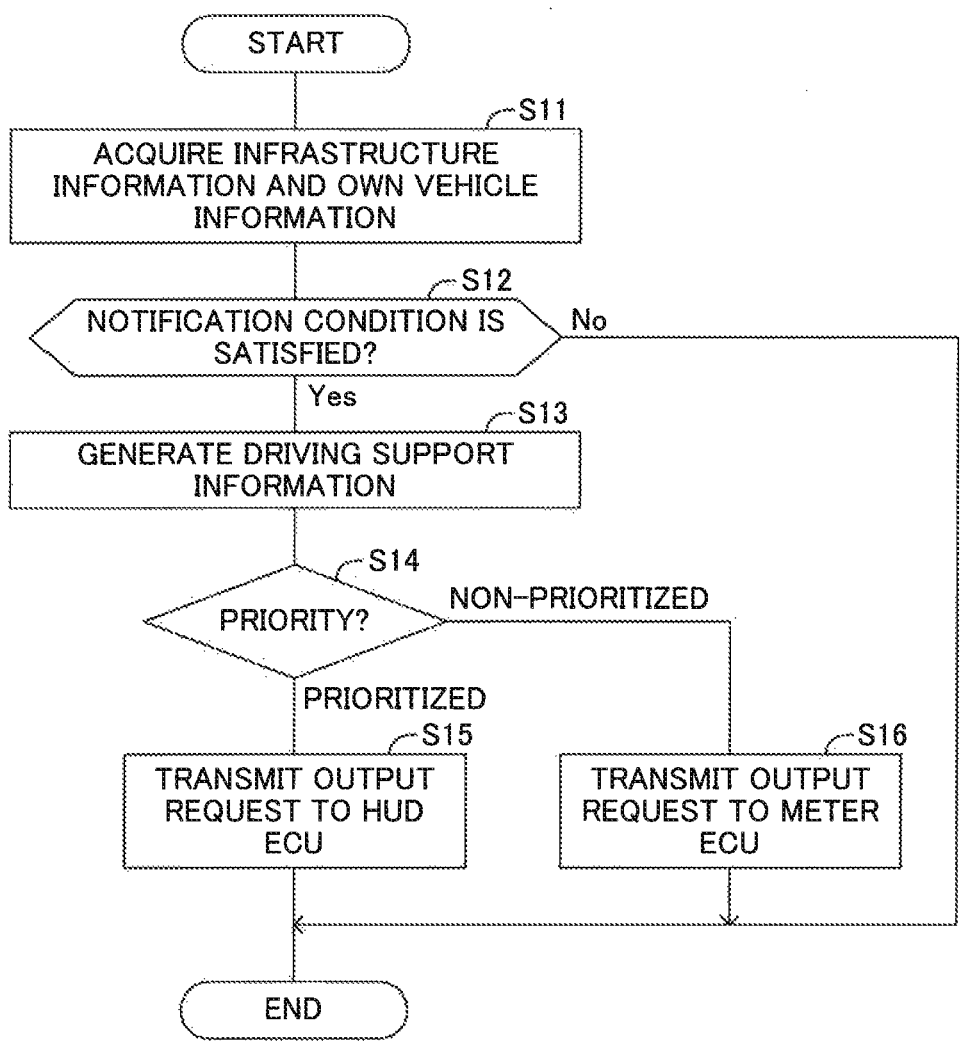
FIG. 2 is a flowchart for illustrating a driving support information display switching control routine.

A description is now given of driving support information display switching processing carried out by the information processing unit 11. FIG. 2 is a flowchart for illustrating a driving support information display switching control routine executed by the information processing unit 11. This routine is repeated at a predetermined calculation cycle during a period in which an ignition switch is turned on.

When this routine is started, in Step S11, the information processing unit 11 acquires the infrastructure information and the own vehicle information. Then, in Step S12, the information processing unit 11 determines whether or not the notification condition set for each of the driving support services is satisfied. In other words, the information processing unit 11 determines whether or not the current state is the state where the driving by the driver needs to be supported (the state where the driving support information needs to be output).

When the information processing unit 11 determines that none of the notification conditions set for the respective driving support services are satisfied, the information processing unit 11 temporary finishes this routine. The information processing unit 11 repeats this processing, and when any one of the notification conditions is satisfied, in Step S13, the information processing unit 11 generates the driving support information corresponding to the satisfied notification condition. The driving support information is to be provided to the driver through the screen display, and the processing in Step S13 is thus processing of generating such display information that makes the driver visually recognize the driving support information.

Then, in Step S14, the information processing unit 11 determines whether the driving support information is the prioritized driving support information or the non-prioritized driving support information. When the driving support information is the prioritized driving support information, in Step S15, the information processing unit 11 transmits an output request for this driving support information to the HUD ECU 30. When the driving support information is the non-prioritized driving support information, in Step S16, the information processing unit 11 transmits an output request for this driving support information to the meter ECU 40. When the information processing unit 11 transmits the output request for the driving support information in Step S15 or Step S16, the information processing unit 11 simultaneously transmits the buzzer output request to the meter ECU 40.

When the HUD ECU 30 receives the output request for the driving support information, the HUD ECU 30 uses a part or the entirety of the display area of the HUD 31 to display the driving support information. For example, when the HUD ECU 30 displays the navigation information (travel route guidance) as the sub-display of the navigation device 20, the HUD ECU 30 restricts the display of the navigation information, and switches a part or the entirety of the navigation information area to the display area for displaying the driving support information. Moreover, when the meter ECU 40 receives the output request for the driving support information, the meter ECU 40 displays the driving support information on the driving support information display area of the meter display 41.

The information processing unit 11 repeats this processing at a predetermined calculation cycle. Thus, each time the state where the driving of the driver needs to be supported occurs, the driving support information is displayed on the HUD 31 or the meter display 41.

For example, when the driving support information is the red traffic signal overlook caution information or the temporary stop overlook caution information, the HUD ECU 30 displays the words "Caution: Red Signal" or "Caution: Temporary Stop" on the HUD 31. Moreover, when the driving support information is the left/right turn obstacle presence notification information, the information processing unit 11 transmits, to the HUD ECU 30, image information for indicating a position of an oncoming vehicle or a position of a pedestrian (bicycle) as a mark on a map representing an intersection shape along with the output request for the driving support information. The HUD ECU 30 displays this image information on the HUD 31. Alternatively, the HUD ECU 30 may not display the image information but may display words representing the presence of an obstacle (oncoming vehicle or pedestrian (bicycle)), e.g., "Caution: Oncoming Vehicle" or "Caution: Pedestrian", on the HUD 31.

Moreover, when the driving support information is the non-prioritized driving support information, the meter ECU 40 displays the driving support information as, e.g., words or a mark. When the driving support information is, e.g., the stopped preceding vehicle presence notification information or the side road vehicle presence notification information, the meter ECU 40 displays words, e.g., "Caution: Stopped Preceding Vehicle" or "Caution: Side Road Vehicle" on the meter display 41. Moreover, when the driving support information is, e.g., the ecological driving support information, the meter ECU 40 displays words, e.g., "Release Accelerator Pedal" or a mark indicating the release of the pedal on the meter display 41. Moreover, when the driving support information is, e.g., the emergency vehicle approach notification information, the meter ECU 40 displays words, e.g., "Emergency Vehicle Approaching" on the meter display 41. In this case, the type of the emergency vehicle (ambulance or fire engine) may be identified and be displayed. Moreover, when the driving support information is, e.g., the start preparation information, the meter ECU 40 displays a waiting period (e.g., the number of seconds) until the traffic light changes to the green signal on the meter display 41.

Thus, this display by the HUD 31 or the meter display 41 can cause the driver to recognize a driving behavior to be taken. As a result, the driving of the driver can be supported. The prioritized driving support information may be displayed on the meter display 41 simultaneously with being displayed on the HUD 31.

With the above-mentioned driving support device according to this embodiment, the driving support information small in the temporal margin from the notification of the driving support information to the safety driving behavior taken by the driver is set as the prioritized driving support information. The driving support information sufficient in the temporal margin from the notification of the driving support information to the safety driving behavior taken by the driver is set as the non-prioritized driving support information. Then, the prioritized driving support information is displayed on the HUD 31, and the non-prioritized driving support information low in priority is displayed on the meter display 41.

Thus, the prioritized driving support information high in the necessity of the early notification to the driver for safe travel is displayed on the HUD 31, and the driver can thus be provided with the driving support information in the state with excellent visibility (state that requires only a slight amount of change of the line of sight). As a result, the driver can quickly and correctly recognize the state of the own vehicle, and can thus take an appropriate safety driving behavior at an early stage.

On the other hand, the non-prioritized driving support information is not displayed on the HUD 31, but is displayed on the meter display 41, and thus does not contend with other in-vehicle devices such as the navigation device 20 in the use of the HUD 31. Therefore, information required by another in-vehicle device can be provided to the driver through use of the HUD 31 excellent in visibility. Moreover, the non-prioritized driving support information is the information low in the necessity of the early recognition by the driver, and therefore displaying the non-prioritized driving support information on the meter display 41 lower in visibility than the HUD 31 poses no problem.

Thus, the HUD 31 limited in the display area can be effectively shared between the driving support device and other in-vehicle devices. Moreover, the driver comes to recognize the driving support information displayed on the HUD 31 as the driving support information high in the necessity of the safety driving behavior. Therefore, the driving support can be provided more satisfactorily.

Modified Embodiment

Figure 3:
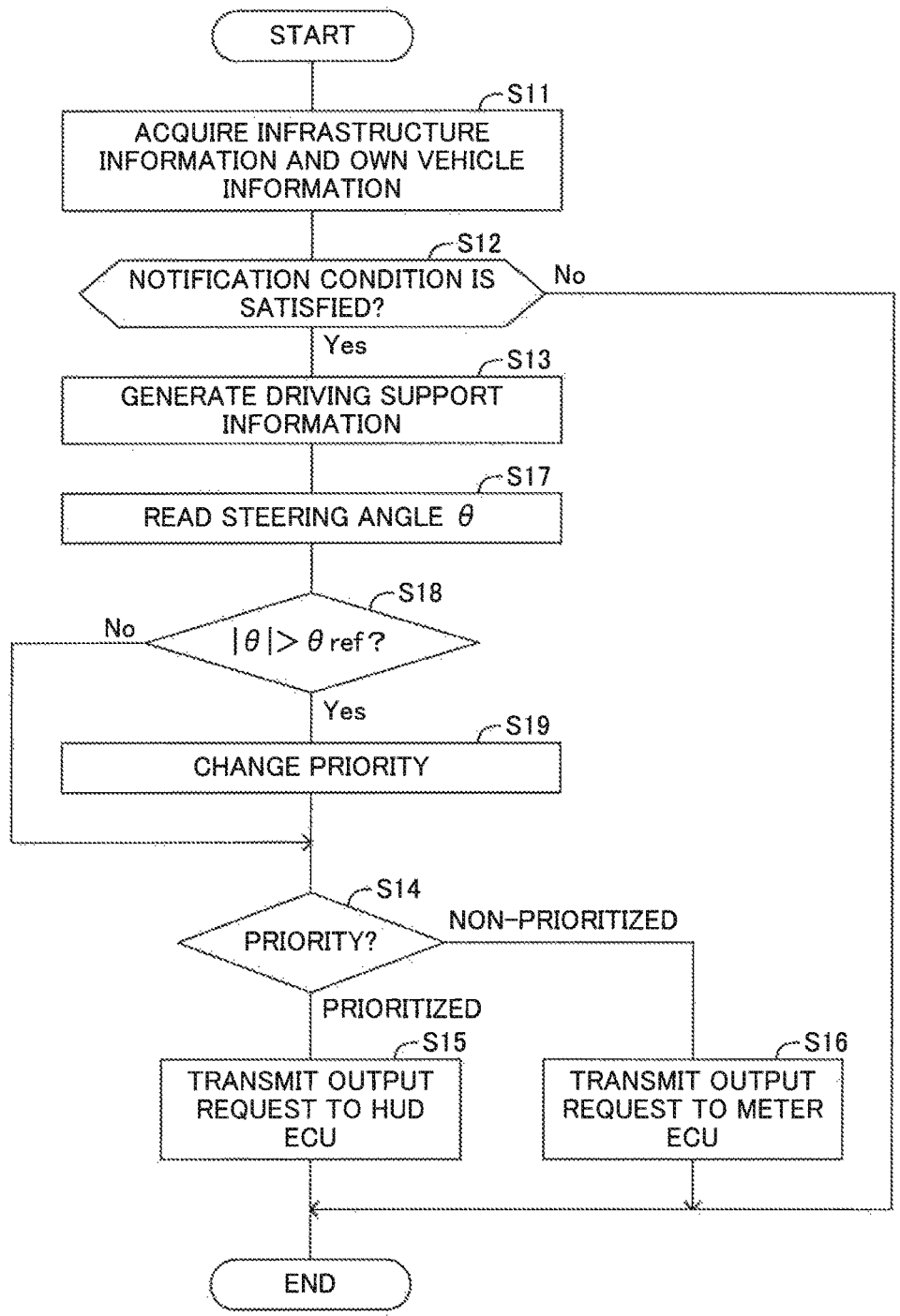
FIG. 3 is a flowchart for illustrating a driving support information display switching control routine according to a modified embodiment.

A description is now given of a modified embodiment of the driving support information display switching control routine. FIG. 3 is a flowchart for illustrating the driving support information display switching control routine according to the modified embodiment. The driving support information display switching control routine according to the modified embodiment includes processing in Steps S17 to S19 between Steps S13 and S14 in the driving support information display switching control routine (FIG. 2) according to the above-mentioned embodiment, and other processing is common to that of the embodiment. Thus, a description is now given of the processing different from that of the embodiment.

Under a state where the driver is operating the steering wheel, the driving support information (non-prioritized driving support information) displayed on the meter display 41 may be hidden by the steering wheel. Therefore, the driver needs to wait until the steering wheel has returned and the driving support information appears in the view of the driver, or, for example, needs to move their head to look into the driving support information display area. In this modified embodiment, usability during the steering wheel operation is improved.

In Step S13, the information processing unit 11 generates the driving support information. Then, in Step S17, the information processing unit 11 reads a steering angle θ of the steering wheel, and, in Step S18, determines whether or not the absolute value |θ| of the steering angle θ is more than a steering threshold θref. The steering angle θ is transmitted from a steering ECU (not shown) to the in-vehicle LAN 60. Thus, the information processing unit 11 reads the steering angle θ transmitted to the in-vehicle LAN 60, and makes the above-mentioned determination. The determination in Step S18 is to detect whether or not the steering wheel operation by the driver has been carried out. The steering threshold θref according to this embodiment is set in advance to a steering angle at which the driving support information display area of the meter display 41 starts to become hard to visually recognize by being hidden by the steering wheel when the steering wheel is turned, but is not always limited to this angle, and may be an angle arbitrarily set. The steering direction (left and right) is identified based on the sign of the steering angle θ, and, on this occasion, the absolute value of the steering angle θ is used.

When the steering angle |θ| is more than the steering threshold θref (Yes in Step S18), in Step S19, the information processing unit 11 temporarily changes the priority of the driving support information. For example, the information processing unit 11 sets all the types of the driving support information to the prioritized driving support information.

On the other hand, when the steering angle |θ| is equal to or less than the steering threshold θref (No in Step S18), the information processing unit 11 skips the processing in Step S19. Thus, the state where the priority of the driving support information (distinction whether the driving support information is the prioritized driving support information or the non-prioritized driving support information) is set based on the priority identification information given in advance is maintained. After the priority is set in this way, the information processing unit 11 proceeds the processing to Step S14.

With the driving support information display switching control routine according to this modified embodiment, under the state where the driver carries out the steering wheel operation, and the driving support information display area of the meter display 41 consequently becomes hard to visually recognize, all the pieces (all the types) of the driving support information are set to the prioritized driving support information. Thus, the driving support information is always displayed on the HUD 31. As a result, the driving support information is not hidden by the steering wheel. Therefore, the driver can recognize the driving support information at an appropriate timing without changing a driving posture. Thus, according to this modified embodiment, the usability during the steering operation can be increased.

In the above-mentioned embodiment, in Step S19, all the types of the driving support information are set to the prioritized driving support information, but only a part of the non-prioritized driving support information set based on the priority identification information may be changed to the prioritized driving support information. For example, the driving support information (the ecological driving support information and the start preparation information in this embodiment) not directly relating to safe driving may be set to the non-prioritized driving support information regardless of whether or not the steering wheel is operated, and the driving support information (the stopped preceding vehicle presence notification information, the side road vehicle presence notification information, and the emergency vehicle approach notification information) relating to safe driving may be changed from the non-prioritized driving support information to the prioritized driving support information when the steering wheel operation is detected (Yes in Step S18).

Moreover, when the priority is changed, the priority after the change may be maintained until the provision of the driving support information is finished even when the steering wheel operation is finished partway through.

In the above, the driving support device according to this embodiment has been described, but the present invention is not limited to the above-mentioned embodiment, and various changes are possible within the range not departing from the object of the present invention.

For example, according to this embodiment, the function of dividing the driving support information into the prioritized driving support information and the non-prioritized driving support information is held by the information processing unit 11 of the vehicle-infrastructure cooperation ECU 10, but, in place of this configuration, the function may be held by the HUD ECU 30 or the meter ECU 40. For example, the information processing unit 11 is configured to transmit the driving support information to the HUD ECU 30, and the HUD ECU 30 is configured to determine whether the received driving support information is the prioritized driving support information or the non-prioritized driving support information. The HUD ECU 30 is configured to display, when the received driving support information is the prioritized driving support information, this driving support information on the HUD 31, and to transmit, when the received driving support information is the non-prioritized driving support information, this driving support information to the meter ECU 40. Alternatively, the information processing unit 11 is configured to transmit the driving support information to the meter ECU 40, and the meter ECU 40 is configured to determine whether this driving support information is the prioritized driving support information or the non-prioritized driving support information. The meter ECU 40 is configured to transmit, when the received driving support information is the prioritized driving support information, this driving support information to the HUD ECU 30, and to display, when the received driving support information is the non-prioritized driving support information, this driving support information on the meter display 41.

Moreover, according to the modified embodiment, the steering wheel operation of the driver is detected based on the determination as to whether or not the steering angle $|\theta|$ is more than the steering threshold $\theta\text{ref}$, but, in place of this configuration, for example, the steering wheel operation may be detected based on determination as to whether or not the absolute value $|\omega|$ of a steering angular velocity $\omega$, which is the derivative of the steering angle $\theta$, is more than a threshold.

What is claimed is:

1. A driving support device comprising:
   a processor configured to:
      acquire information related to vehicle traffic;
      acquire own vehicle information representing a position and a driving state of an own vehicle;
      determine whether or not one of a plurality of driver notification conditions are satisfied based on the acquired information related to the vehicle traffic and the acquired own vehicle information; and
      when the one of the driver notification conditions are determined to be satisfied:
         determine whether driving support information corresponding to the one of the driver notification conditions that is determined to be satisfied is prioritized driving support information high in necessity of early recognition by a driver of the own vehicle, or non-prioritized driving support information that is low in the necessity of the early recognition by the driver compared with the prioritized driving support information;
         in a case that the driving support information is the prioritized driving support information: cause a heads-up display to display the prioritized driving support information; and
         in a case that the driving support information is the non-prioritized driving support information, cause a meter display to display the non-prioritized driving support information, wherein
            the meter display is different from the heads-up display, and
            the heads-up display is configured to display the prioritized driving support information on a front windshield of the own vehicle.

2. The driving support device according to claim 1, wherein the processor is further programmed to:
   detect an operation on a steering wheel, and
   cause the heads-up display to display at least a part of the non-prioritized driving support information when the operation on the steering wheel is detected.

3. The driving support device according to claim 1, wherein the information related to the vehicle traffic includes at least one of: obstacle detection information including at least another vehicle detected at an area in a vicinity of the own vehicle, travel restriction information for restricting a travel of the own vehicle, and map information representing a position of an intersection in the vicinity of the own vehicle and a road connected to the intersection.

4. The driving support device according to claim 3, wherein
   the driving support information includes obstacle presence notification information for notifying, in a case where presence of an obstacle constituting an obstruction to travel of the own vehicle is detected when the own vehicle turns one of right and left at an intersection, the driver of the presence of the obstacle, and
   the processor is configured to determine that the obstacle presence notification information is the prioritized driving support information.

5. The driving support device according to claim 3, wherein
   the driving support information includes overlook caution information that is notified in one of a case where the driver is assumed to overlook a temporary stop sign, and a case where the driver is assumed to overlook a red traffic signal, and the processor is configured to determine that the overlook caution information is the prioritized driving support information.

6. The driving support device according to claim 1, wherein the processor is configured to restrict, when a notification condition for the prioritized driving support information is satisfied, display of information, which has been displayed on the head-up display until immediately before the satisfaction of the notification condition, and which has been required to be output by another in-vehicle device, to thereby display the prioritized driving support information on the heads-up display.

7. The driving support device according to claim 2, wherein the information related to the vehicle traffic includes at least one of: obstacle detection information on at least another vehicle detected at an area in a vicinity of the own vehicle, travel restriction information for restricting a travel of the own vehicle, and map information representing a position of an intersection in the vicinity of the own vehicle and a road connected to the intersection.

8. A method comprising:
acquiring information related to vehicle traffic;
acquiring own vehicle information representing a position and a driving state of an own vehicle;
determining whether or not one of a plurality of driver notification conditions are satisfied based on the acquired information related to the vehicle traffic and the acquired own vehicle information; and
when the one of the driver notification conditions are determined to be satisfied:
determining whether driving support information corresponding to the one of the driver notification conditions that is determined to be satisfied is prioritized driving support information high in necessity of early recognition by a driver of the own vehicle, or non-prioritized driving support information that is low in the necessity of the early recognition by the driver compared with the prioritized driving support information;
in a case that the driving support information is the prioritized driving support information: causing a heads-up display to display the prioritized driving support information; and
in a case that the driving support information is the non-prioritized driving support information, causing a meter display to display the non-prioritized driving support information, wherein
the meter display is different from the heads-up display, and
the heads-up display is configured to display the prioritized driving support information on a front windshield of the own vehicle.

9. A display control device comprising:
a processor configured to:
acquire traveling information on a traveling state of an own vehicle and environment information on an immediate environment of the own vehicle;
generate driving support information on driving support for a driver of the own vehicle based on the acquired traveling information and the acquired environment information;
determine whether the generated driving support information is to be displayed on a front windshield of the own vehicle as a projective image or is to be displayed on a display panel of the own vehicle;
in a case that the generated driving support information is determined to be displayed on the front windshield of the own vehicle, cause the generated driving support information to be displayed on the front windshield of the own vehicle as the projective image; and
in a case that the generated driving support information is determined to be displayed on the display panel of the own vehicle, cause the display panel of the own vehicle to display the generated driving support information.

10. The display control device according to claim 9, further comprising a memory that records corresponding relationship information on a corresponding relationship between the driving support information and a display priority of the driving support information, wherein the processor is further configured to determine, based on the corresponding relationship information recorded in the memory, whether the generated driving support information is to be displayed on the front windshield of the own vehicle as the projective image or is to be displayed on the display panel of the own vehicle.

11. The display control device according to claim 10, wherein
the generated driving support information is displayed on the front windshield of the own vehicle as the projective image when the priority of the generated driving support information satisfies a first condition, and
the generated driving support information is displayed on the display panel of the own vehicle when the priority of the generated driving support information does not satisfy the first condition.

12. The display control device according to claim 11, wherein
the generated driving support information is displayed on the front windshield of the own vehicle as the projective image when a steering angle of the own vehicle satisfies a second condition under a state where the priority of the generated driving support information does not satisfy the first condition.

* * * * *